United States Patent
Kondo

(10) Patent No.: US 8,424,084 B2
(45) Date of Patent: Apr. 16, 2013

(54) ELECTRONIC DEVICE FOR VERIFYING VALIDITY OF CONTENTS OF STORAGE MEDIUM

(75) Inventor: Mayu Kondo, Chiba (JP)

(73) Assignee: Ricoh Company, Ltd., Tokyo (JP)

( * ) Notice: Subject to any disclaimer, the term of this patent is extended or adjusted under 35 U.S.C. 154(b) by 1281 days.

(21) Appl. No.: 11/968,457

(22) Filed: Jan. 2, 2008

(65) Prior Publication Data

US 2008/0172740 A1  Jul. 17, 2008

(30) Foreign Application Priority Data

Jan. 15, 2007 (JP) .................... 2007-005533

(51) Int. Cl.
*G06F 11/00* (2006.01)
(52) U.S. Cl.
USPC ............................................. 726/22
(58) Field of Classification Search ............. 713/193, 713/194, 2, 176, 180, 187, 189, 340; 726/26, 726/27, 30, 22, 23
See application file for complete search history.

(56) References Cited

U.S. PATENT DOCUMENTS

| 7,703,143 B2 * | 4/2010 | Harada et al. ................ 726/26 |
| 2006/0069840 A1 * | 3/2006 | Corbett et al. ............... 710/313 |
| 2006/0155988 A1 * | 7/2006 | Hunter et al. ................ 713/164 |
| 2006/0158968 A1 * | 7/2006 | Vanman et al. ............. 369/27.01 |
| 2006/0282683 A1 * | 12/2006 | Chandramouli et al. ..... 713/189 |
| 2007/0250918 A1 * | 10/2007 | Aboual Chamat ............ 726/5 |
| 2009/0144582 A1 * | 6/2009 | Li et al. .......................... 714/6 |

FOREIGN PATENT DOCUMENTS

JP          2004-46801       2/2004

* cited by examiner

*Primary Examiner* — Beemnet Dada
(74) *Attorney, Agent, or Firm* — Oblon, Spivak, McClelland, Maier & Neustadt, L.L.P.

(57) ABSTRACT

A disclosed electronic device for performing a process in accordance with contents of a removable storage medium includes: a storing unit obtaining verification data for verifying validity of the contents of the storage medium before shifting to a power supply state in which detection of installation and removal of the storage medium is disabled and storing the verification data in a storage unit as saving verification data; and a verification unit comparing, when the detection of the installation and removal of the storage medium is enabled, newly obtained verification data with the saving verification data read from the storage unit so as to verify the validity of the contents of the storage medium.

12 Claims, 13 Drawing Sheets

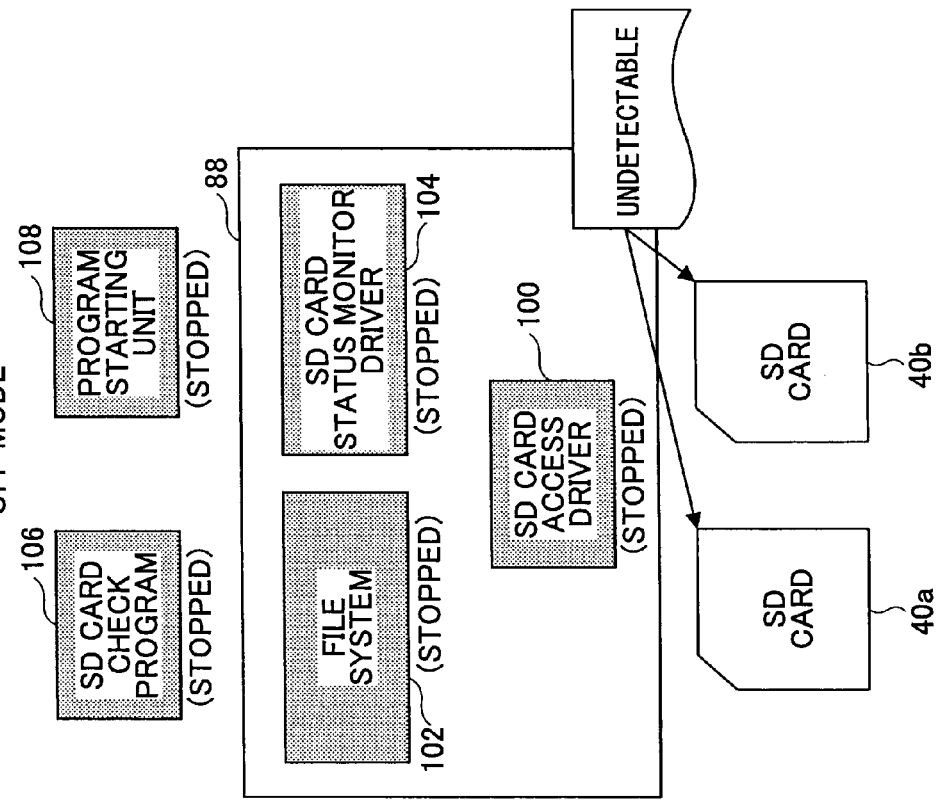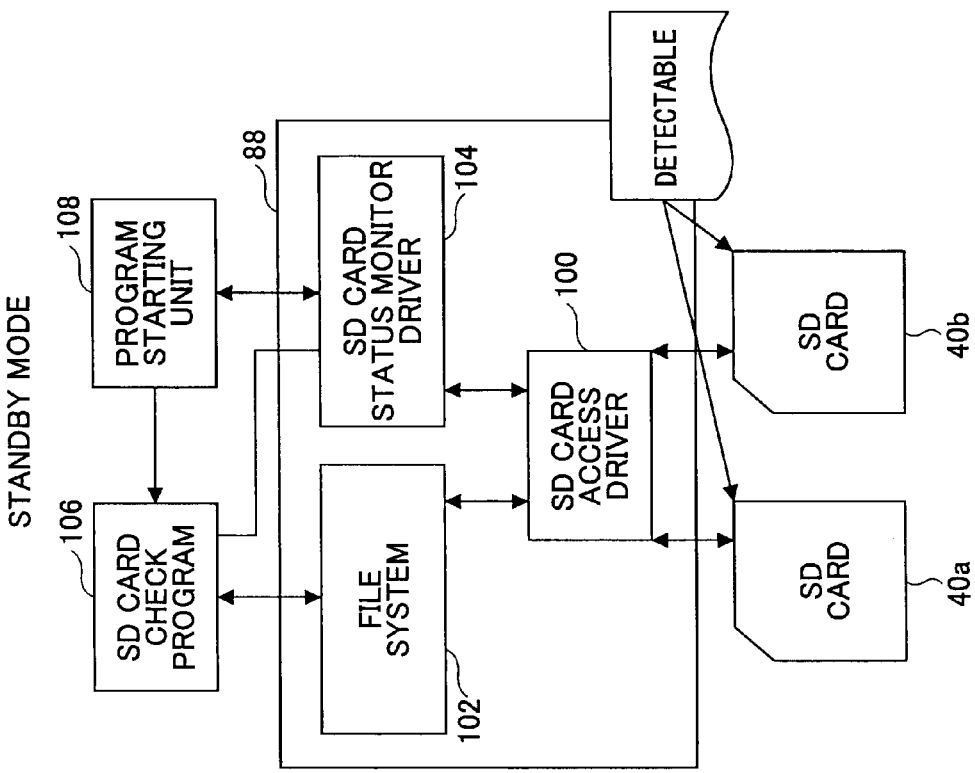

FIG.7A

BEFORE SHIFTING TO CONTROLLER OFF MODE (FOR SAVING)

| SERIAL ID | 1111111 |
|---|---|

| FILE NAME | FILE SIZE | UPDATE TIME |
|---|---|---|
| FILE 1 | 100KB | 2006/08/01 13:00 |
| FILE 2 | 200KB | 2006/08/02 15:00 |
| FILE 3 | 300KB | 2006/08/03 17:00 |
| ⋮ | ⋮ | ⋮ |

FIG.7B

AFTER RETURNING FROM CONTROLLER OFF MODE (FOR COMPARISON)

| SERIAL ID | 1111111 |
|---|---|

| FILE NAME | FILE SIZE | UPDATE TIME |
|---|---|---|
| FILE 1 | 100KB | 2006/08/01 13:00 |
| FILE 2 | 200KB | 2006/08/02 15:00 |
| FILE 3 | 400KB | 2006/08/03 17:00 |
| ⋮ | ⋮ | ⋮ |

ELECTRONIC DEVICE FOR VERIFYING VALIDITY OF CONTENTS OF STORAGE MEDIUM

BACKGROUND OF THE INVENTION

1. Field of the Invention

The present invention generally relates to a security technique and more particularly to an electronic device and a program enabling detection of unauthorized operations performed on a removable storage medium during a power-saving state by confirming validity of data in the storage medium upon returning from the power-saving state.

2. Description of the Related Art

With the increasing energy-saving consciousness in recent years, electronic devices such as copiers, printer devices, multi-function devices (MFP), personal computers (PC), and the like, are controlled to shift to various types of energy-saving modes in which power supply to each element of hardware in the electronic devices is stopped after detecting an idle state for a certain period of time or a time range set in advance. For example, the multi-function devices control a status of electric power at a heater power source to a fuser for a print process, a motor power source to a spindle of a hard disk, and a panel power source to a touch panel, and power supply to each device of an engine controller and a main controller. Power-saving modes having various levels of power supply have been prepared.

Examples of the above-mentioned power-saving modes include an STR (Suspend to RAM) mode for stopping power supply to almost all devices such as a CPU, hard disk, and the like on the main controller while a current operation state is stored in a memory, a controller off mode for stopping the power supply to an entire portion of the main controller further including the memory, and the like. When the multi-function devices have shifted to these power-saving modes, the power-saving modes are released through touch panel operation by an operator and data reception via a network or an interface. Then, the power supply to each element of hardware is resumed and the multi-function devices return to a normal stand-by mode.

In terms of energy saving, preferably, the power-saving modes sequentially shift to a lower level of power supply in accordance with an operation state of the electronic devices. On the other hand, when electronic devices have shifted to the power-saving mode, the power supply to each element of hardware is sequentially stopped. Accordingly, as the level of power supply becomes lower, time for returning is increased, for example, and this poses a problem in that usability for a user is reduced. Further, in recent years, problems in terms of security resulting from the power-saving modes have become evident. In the following, the problems in terms of security are described.

In electronic devices of recent years such as multi-function devices, programs and user data are stored in a removable storage medium such as a Secure Digital memory card (hereafter referred to as an SD card) and these application programs are read from the storage medium so as to add, update, and expand functions of applications or the user data is read so as to use it in the application, for example. However, it is possible to expand functions through easy operation, so that the storage medium may be used in plural multi-function devices. In view of this, it is necessary to take measures for security so as to prevent unauthorized use.

For example, with the purpose of providing an image forming apparatus capable of readily preventing use of an insertable storage medium in plural devices and a method for stopping a program, Japanese Laid-Open Patent Application No. 2004-46801 (Patent Document 1) discloses an image forming apparatus including a program performing a process using hardware resources and a slot capable of inserting and removing a storage medium. The image forming apparatus also includes a status monitoring unit monitoring insertion and removal of the storage medium for the slot, a storage medium starting unit enabling access of the storage medium inserted into the slot and disabling access of the storage medium removed from the slot, and a program starting unit stopping the program read and started from the storage medium upon receiving notification of removal of the storage medium from the slot while reading and starting the program from the access-enabled storage medium.

Patent Document 1: Japanese Laid-Open Patent Application No. 2004-46801

FIGS. 1A and 1B show examples of operation state of a software unit controlling removable storage media (SD cards, for example) in a normal standby mode (FIG. 1A) and a controller off mode (FIG. 1B). As shown in FIG. 1A, in the standby mode in which a CPU and an SD card slot are supplied with sufficient electric power on a main controller, a kernel of an operating system (OS) and each software unit are expanded in a memory area under control of the CPU and are in an operating state. Accordingly, installation and removal of the SD card from the slot are detected through monitoring by the software unit and it is possible to perform a process in accordance with the installation and removal of the SD card.

By contrast, when the power supply to the CPU is stopped as in the controller off mode, for example, as shown in FIG. 1B, the software unit controlling the SD card slot is stopped, so that it is impossible to detect the installation or removal of the SD card. In the same manner, while the power supply to the SD card slot is stopped, even if the software unit is in the operating state, it is impossible to detect the installation and removal of the SD card.

In other words, in the above-mentioned conventional technique, when electric power is sufficiently supplied to hardware such as the control unit (CPU), the slot capable of installing and removing the storage medium, and the like on the main controller (standby mode or other power supply mode having a high level of power supply), it is possible to detect the installation and removal of the storage medium. However, in those power supply modes such as the above-mentioned STR mode and the controller off mode in which the power supply to the control unit or the slot is stopped, it is impossible to detect the installation and removal of the storage medium.

Further, in those power supply modes in which the power supply to the control unit or the slot is stopped, it is impossible to detect the installation or removal of the storage medium, so that even if the storage medium is removed during the power supply mode, it is impossible to detect the removal operation when the storage medium is installed on the slot again before returning. In other words, other than the above-mentioned use of the storage medium in plural devices, there are problems in that there is a possibility that a third person with malicious intention may perform unauthorized operations such as altering or stealing of contents stored in the storage medium during the power supply mode and there is a risk of inducing abnormal operation or abnormal end of an active application or an electronic device. User data on an address book and the like is not protected using electronic authentication in many cases, so that there is a problem in that altered user data may be used without being noticed by the user and important business information may be transferred via facsimile or as a file to an erroneous destination.

SUMMARY OF THE INVENTION

It is a general object of the present invention to provide an improved and useful electronic device and a program in which the above-mentioned problems are eliminated.

A more specific object of the present invention is to provide an electronic device and a program that can detect unauthorized operations performed on a storage medium and handle when such an unauthorized operation is performed on the storage medium even when the electronic device has shifted to a power supply mode in which power supply to a control unit or a slot is stopped and detection of installation and removal of the storage medium is disabled.

According to one aspect of the present invention, there is provided an electronic device for performing a process in accordance with contents of a removable storage medium, the electronic device comprising: a storing unit obtaining verification data for verifying validity of the contents of the storage medium before shifting to a power supply state in which detection of installation and removal of the storage medium is disabled and storing the verification data in a storage unit as saving verification data; and a verification unit comparing, when the detection of the installation and removal of the storage medium is enabled, newly obtained verification data with the saving verification data read from the storage unit so as to verify the validity of the contents of the storage medium.

In the electronic device according to the above-mentioned invention, the storing unit may suspend the shifting to the power supply state until the storing of the verification data is completed. Moreover, the electronic device according to the above-mentioned invention may further include: a notification unit notifying that the validity of the contents of the storage medium is not confirmed as a result of verification of the validity by the verification unit when the newly obtained verification data does not correspond to the saving verification data. Moreover, the electronic device according to the above-mentioned invention may further include: a lock unit rejecting receiving an operation request to the electronic device as a result of verification of the validity by the verification unit when the newly obtained verification data does not correspond to the saving verification data.

The electronic device according to the above-mentioned invention may further include: a process unit performing, as a result of verification of the validity by the verification unit when the newly obtained verification data does not correspond to the saving verification data, a discrepancy handling process including restoration and deletion for a file judged to be not correspondent and stopping of a process on a memory corresponding to the file. In the electronic device according to the above-mentioned invention, the verification data may include an identification value of the storage medium, a directory structure of the storage medium, a file stored in the storage medium, a name of the file, an update time of the file, an access time of the file, a file size of the file, an access attribute of the file, and a hash value of the file.

According to another aspect of the present invention, there is provided a computer-readable medium storing a computer-readable program which, when executed by an electronic device for performing a process in accordance with contents of a removable storage medium, causes the electronic device to perform the functions of: obtaining verification data for verifying validity of the contents of the storage medium before shifting to a power supply state in which detection of installation and removal of the storage medium is disabled; storing the verification data in a storage unit as saving verification data; and comparing, when the detection of the installation and removal of the storage medium is enabled, newly obtained verification data with the saving verification data read from the storage unit so as to verify the validity of the contents of the storage medium.

In the computer-readable medium storing a computer-readable program according to the above-mentioned invention, the shifting to the power supply state may be suspended until the storing of the verification data is completed. Further, the computer-readable medium storing a computer-readable program according to the above-mentioned invention may include the function of: notifying that the validity of the contents of the storage medium is not confirmed as a result of verification of the validity by the verification unit when the newly obtained verification data does not correspond to the saving verification data. Further, the computer-readable medium storing a computer-readable program according to the above-mentioned invention may include the function of: rejecting receiving an operation request to the electronic device as a result of verification of the validity by the verification unit when the newly obtained verification data does not correspond to the saving verification data.

Further, the computer-readable medium storing a computer-readable program according to the above-mentioned invention may include the function of: performing, as a result of verification of the validity by the verification unit when the newly obtained verification data does not correspond to the saving verification data, a discrepancy handling process including restoration and deletion for a file judged to be not correspondent and stopping of a process on a memory corresponding to the file. In the computer-readable medium storing a computer-readable program according to the above-mentioned invention, the verification data may include an identification value of the storage medium, a directory structure of the storage medium, a file stored in the storage medium, a name of the file, an update time of the file, an access time of the file, a file size of the file, an access attribute of the file, and a hash value of the file.

Other objects, features and advantage of the present invention will become more apparent from the following detailed description when read in conjunction with the accompanying drawings.

BRIEF DESCRIPTION OF THE DRAWINGS

FIG. 1A is a diagram showing an operation state of a software unit controlling a removable storage medium in a normal standby mode;

FIG. 1B is a diagram showing an operation state of a software unit controlling a removable storage medium in a normal controller off mode;

FIG. 7A is a diagram showing an embodiment of a data structure of verification data used upon verifying validity of an SD card;

FIG. 7B is a diagram showing an embodiment of a data structure of verification data used upon verifying validity of an SD card;

DETAILED DESCRIPTION OF THE PREFERRED EMBODIMENTS

In the following, embodiments of the present invention will be described with reference to the accompanying drawings. In the present embodiment, an example of an electronic device is described as an image forming apparatus 10 having functions for handling images of a copier, facsimile machine, scanner, and printer.

Figure 2:
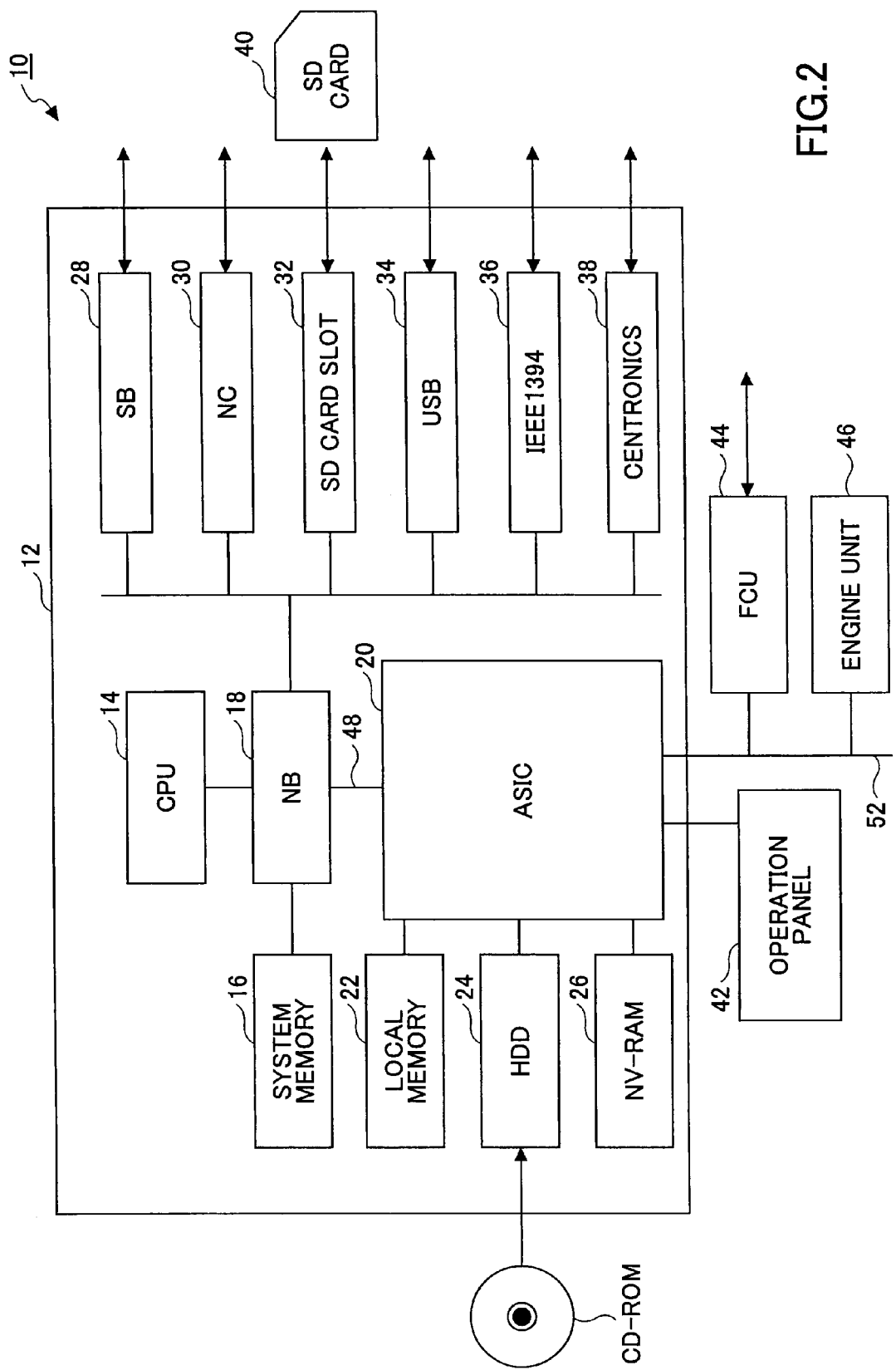
FIG. 2 is a diagram showing an embodiment of a hardware structure of an electronic device.

FIG. 2 is a diagram showing an embodiment of a hardware structure of the image forming apparatus 10. A structure of the image forming apparatus 10 shown in FIG. 2 corresponds to that of an image forming apparatus having plural functions such as MFP or the like. The image forming apparatus 10 includes a controller 12, operation panel 42, FCU (facsimile control unit) 44, and engine unit 46. The controller 12 includes a CPU (central processing unit) 14, NB (north bridge) 18, ASIC 20 connected to the CPU 14 via the NB (north bridge) 18, and system memory 16. The ASIC 20 performs various types of image processing and is connected to the NB 18 via an AGP (Accelerated Graphic Port) 48. The system memory 16 is used as a memory for drawing and the like.

The ASIC 20 is connected to a local memory 22, hard disk (HDD) 24 with a storage media drive such as a CD-ROM drive from which data including a program in a computer-readable medium such as a CD-ROM is installed, for example, non-volatile memory (NV-RAM) 26 such as a flash memory. The local memory 22 is used as an image buffer for copying or a code buffer. The HDD 24 is used as a storage for accumulating image data, document data, programs, font data, form data, and the like. The NV-RAM 26 stores a program for controlling the image forming apparatus 10. The HDD 24 and the NV-RAM 26 are used for storing verification data for verifying data contents such as a file stored in an SD card 40 described later.

The controller 12 further includes an SB (south bridge) 28, NIC (network interface card) 30, SD card slot 32, USB interface 34, IEEE 1394 interface 36, and Centronics interface 38. The elements are connected to the NB 18 via a PCI bus 50. The SD card slot 32 enables the SD card 40 to be installed and removed. The NIC 30 is a network interface device for connecting the image forming apparatus 10 to a network such as the Internet, a LAN, and the like and receives printing jobs and the like via the network. The USB interface 34, IEEE 1394 interface 36, and Centronics interface 38 are interfaces complying with the standard for each device. The SB 28 is a bridge for connecting the PCI bus 50 to peripheral devices such as ROM and the like not shown in the drawings.

The operation panel 42 is connected to the ASIC 20 of the controller 12, receives inputs of various types of instructions from the operator, and performs screen output, thereby providing a user interface. The FCU 44 and the engine unit 46 are connected to the ASIC 20 via a PCI bus 52. The engine unit 46 obtains an image formation instruction and image data issued from applications 62 to 70 and performs an image formation process and an image reading process.

The image forming apparatus 10 is capable of having various types of electric power modes in which power supply to each hardware element of the image forming apparatus 10 is stopped. Depending on intended use and the structure of the device, the image forming apparatus 10 is capable of having various types of power supply modes for controlling a level of power supply to each hardware element such as various types of devices, the engine unit 46, operation panel 42, CPU 14, system memory 16, and the like. For example, the image forming apparatus 10 is capable of detecting a certain period of time elapsed as an idle state using a timer function of the CPU 14 and controlling shifting between each power supply mode.

Figure 3:
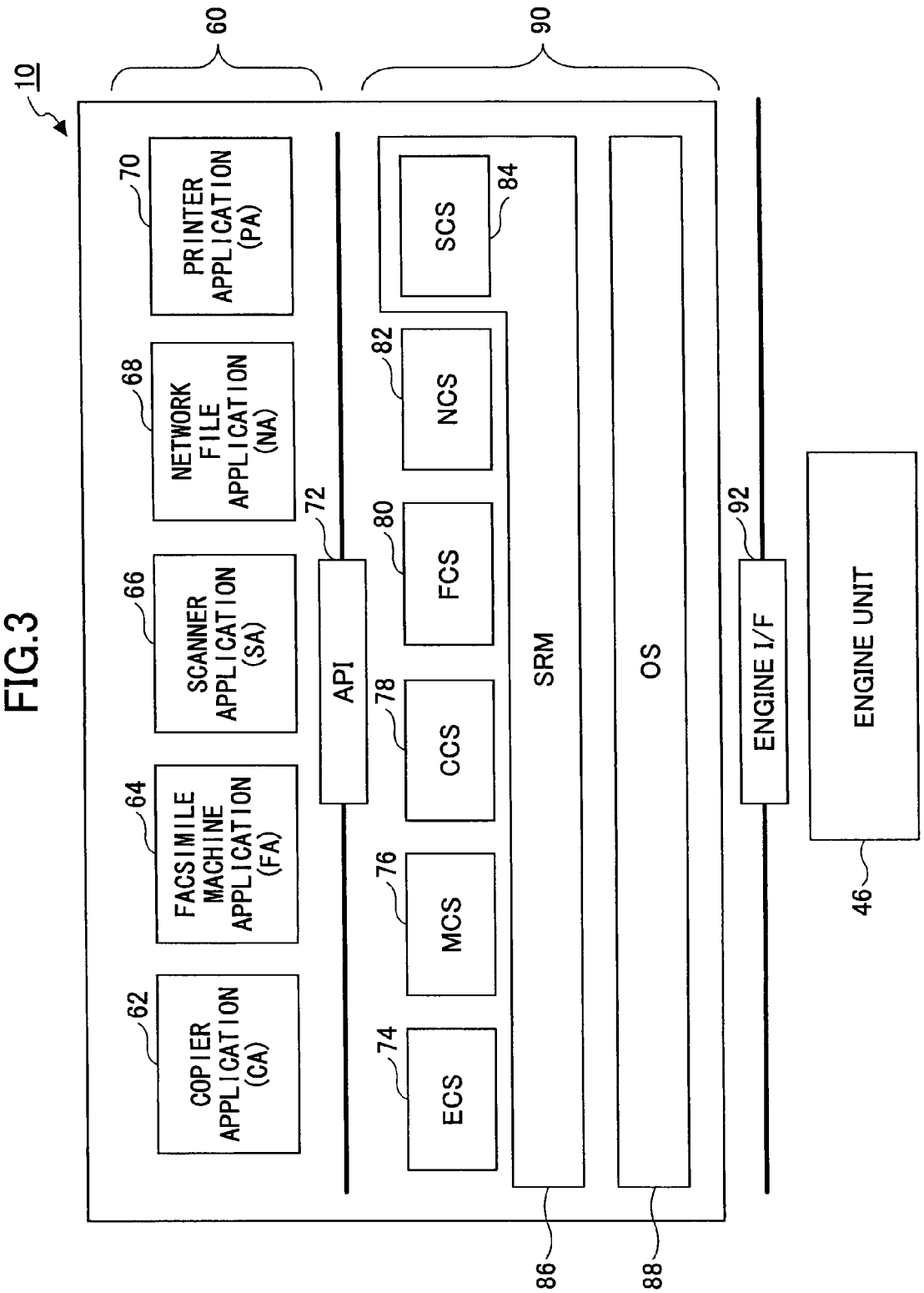
FIG. 3 is a diagram showing a software and hardware structure of an electronic device according to an embodiment.

FIG. 3 is a diagram showing a software and hardware structure of the image forming apparatus 10 according to the present embodiment. The image forming apparatus 10 shown in FIG. 3 includes an application layer 60 having various types of applications 62 to 70 for providing functions as a multi-function device, a platform layer 90, and the engine unit 46 connected to the platform layer 90 via an engine interface (I/F) 92.

The application layer 60 performs a process specific to user services related to image formation of a printer, copier, facsimile machine, scanner, and the like. In the embodiment shown in FIG. 3, the application layer 60 includes a copier application 62 providing a copier function, facsimile machine application 64 providing a facsimile machine function, scanner application 66 providing a scanner function, network file application 68 providing a network file function, and printer application 70 providing a printer function.

The platform layer 90 includes each control service 74 to 84 interpreting a process request from the applications 62 to 70 together with an OS 88 and generating a request for obtaining hardware resources and a system resource management unit (SRM) 86 managing a single or plural hardware resources and adjusting the obtaining request from the control services 74 to 84. Although the OS may employ UNIX (registered trademark), for example, it is possible to employ WINDOWS (registered trademark) or any other OS. In the embodiment shown in FIG. 3, examples of various types of control services include an engine control service (ECS) 74, memory control service (MCS) 76, operation control service (OCS) 78, facsimile control service (FCS) 80, network control service (NCS) 82, and system control service (SCS) 84.

The SCS 84 manages various types of applications, controls a user interface such as a system screen display and an LED display, manages hardware resources, controls interrupt applications, and the like. The MCS 76 performs memory control such as obtaining and releasing an image memory, compression and extraction of image data, and the like. The ECS 74 controls hardware resources such as the engine unit 46, HDD 24, and the like and performs image reading, printing operation, and the like. The FCS 80 is connected to the a GSTN interface and performs facsimile transmission or reception using a GSTN net, registration/citation of various types of facsimile data managed in a backup memory, facsimile reading, and the like.

The OCS 78 controls the operation panel 42 used as an interface between the operator and apparatus control. The NCS 82 controls the NIC 30 to connect the image forming apparatus 10 to an Ethernet (registered trademark), provides services available commonly among applications requiring a network I/O, distributes data received from the network in each protocol to each application, and intermediates upon transmitting data from each application to the network. Specifically, the NCS 82 is capable of including server daemons of ftpd, httpd, lpd, snmpd, telnetd, smtpd, a client function of the same protocol, and the like.

Further, an application program interface (API) 72 is disposed between the platform layer 90 and the application layer 60. The platform layer 90 receives a process request from the various types of applications 62 to 70 using functions defined in advance and included in the API.

Hardware resources of the image forming apparatus 10 such as the engine unit 46, HDD 24, NV-RAM 26, and the like are controlled by the above-mentioned software group and the image forming apparatus 10 provides the user with functions of an image forming apparatus such as a copier, facsimile machine, monochrome copier, full-color copier, and the like in response to user instructions via the user interface and input from external computers.

Moreover, the image forming apparatus 10 shown in FIG. 2 reads a program (not shown in the drawings) stored in storage devices such as a ROM (not shown in the drawings), HDD 24, NV-RAM 26, SD card 40, and the like and expands the read program on a memory area of a memory (system memory 16 or local memory 22) providing a working memory area for the CPU 14. In accordance with this, the image forming apparatus 10 realizes the above-mentioned software units and each process unit mentioned later.

In addition, it is possible to construct the above-mentioned applications, control services, and hardware using various types of combinations. For example, the above-mentioned applications, control services, and hardware may be added or deleted in accordance with a specific purpose and types of devices. In the embodiment shown in FIG. 3, the common portion among the applications and control services in the multi-function device is extracted and referred to as a platform structure. However, the hardware and software structure of the image forming apparatus 10 is not limited in particular.

Figure 4:
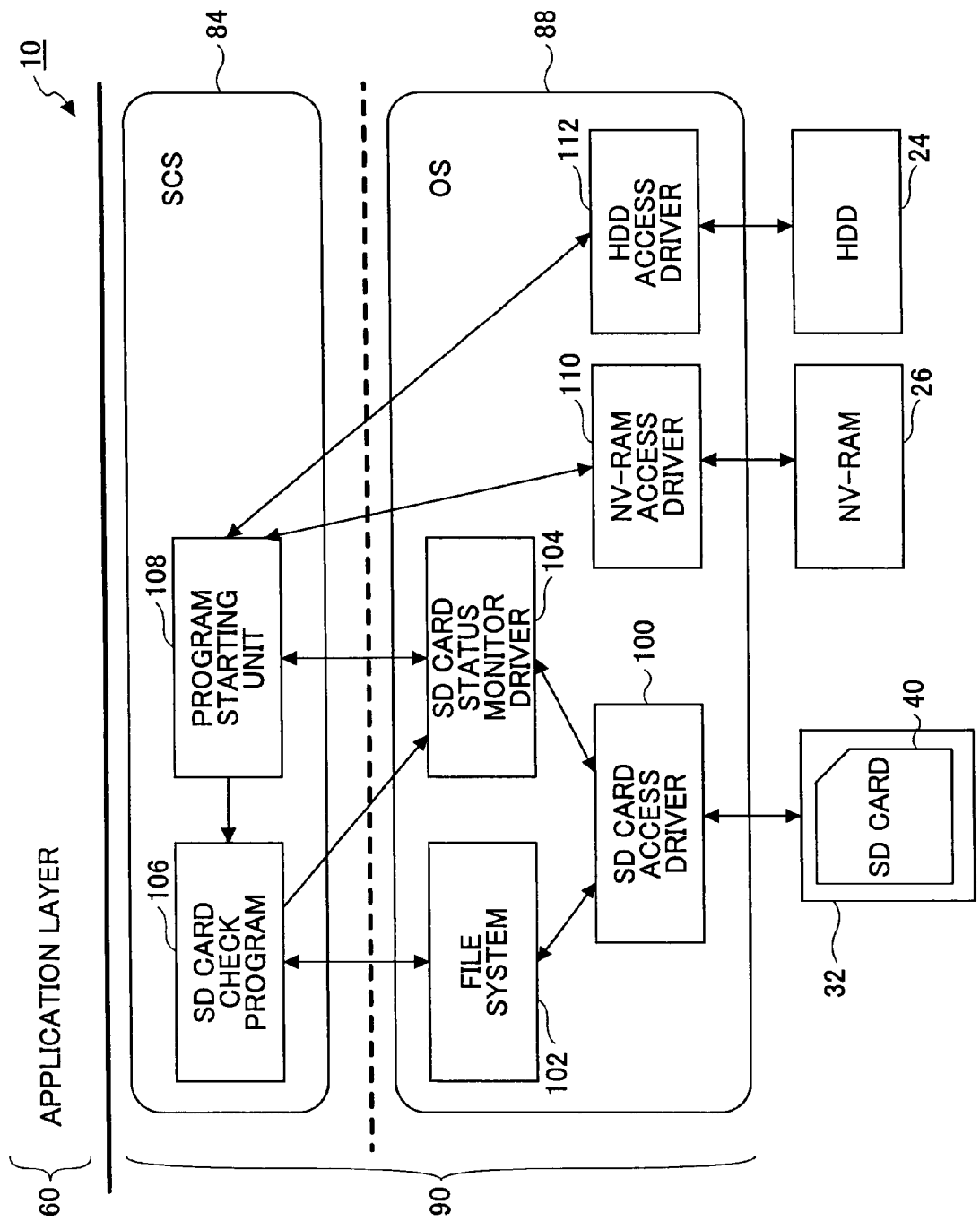
FIG. 4 is a block diagram showing a software structure of an electronic device according to an embodiment.

FIG. 4 is a block diagram showing a software structure of the image forming apparatus 10 according to the present embodiment. In the following, an SD card is used as a removable storage medium for the image forming apparatus 10, for example. The SD card is what is called a hot-swappable storage medium capable of being connected or removed from the image forming apparatus 10 while the image forming apparatus 10 is powered on. The image forming apparatus 10 includes the SD card slot 32 (hereafter simply referred to as a slot), as software units for the SD card 40, an SD card access driver 100, and an SD card status monitor driver 104. The slot 32 interrupts the SD card access driver 100 in accordance with installation or removal of the SD card 40. The SD card access driver 100 performs access control on the SD card 40 and notifies the installation or removal of the SD card 40 to the SD card status monitor driver 104 in accordance with the interrupt from the slot 32.

The SD card status monitor driver 104 manages status information such as installation, removal, mount, unmount, and the like of the SD card 40 and notifies the status information to a program starting unit 108 of the SCS 84. The program starting unit 108 starts an SD card check program 106 in accordance with the installation or removal of the SD card 40 and starts a program stored in the SD card 40 in accordance with the status information from the SD card status monitor driver 104.

The SD card check program 106 examines whether a partition and a status of a file system of the SD card 40 is correct and enables the SD card 40 as a file system 102. Further, the SD card check program 106 has a check function, mount function, unmount function, and status notifying function for the SD card 40. In the following, an operation where the SD card 40 is installed is described in detail.

When the SD card 40 is installed on the slot 32, the SD card access driver 100 detects the installation of the SD card 40 and notifies the installation to the SD card status monitor driver 104. The SD card status monitor driver 104 which has received the notification manages the information of installation and notifies the installation to the program starting unit 108. The program starting unit 108 which has received the notification starts the SD card check program 106 so as to mount the SD card 40. The started SD card check program 106 performs the mount and notifies the performed mount to the SD card status monitor driver 104, thereby enabling access to the SD card 40.

The SD card status monitor driver 104 which has received the notification manages the information of the performed mount and notifies the performed mount to the program starting unit 108. The program starting unit 108 which has received the notification reads a configuration file stored in the SD card 40 and performs a mount process on a program (module) in accordance with description of the configuration file. In addition, before the program is mounted, it is possible to perform a process of electronic authentication using a library function for electronic authentication.

The program starting unit 108 is also capable of starting the program stored in the NV-RAM 26 or the HDD 24 via an NV-RAM access driver 110 or an HDD access driver 112 upon starting the image forming apparatus 10, for example. Further, it is possible to read and use user data on an address book and the like as a file read from the above-mentioned SD card other than executable programs (applications and SDK applications).

Figure 5B:
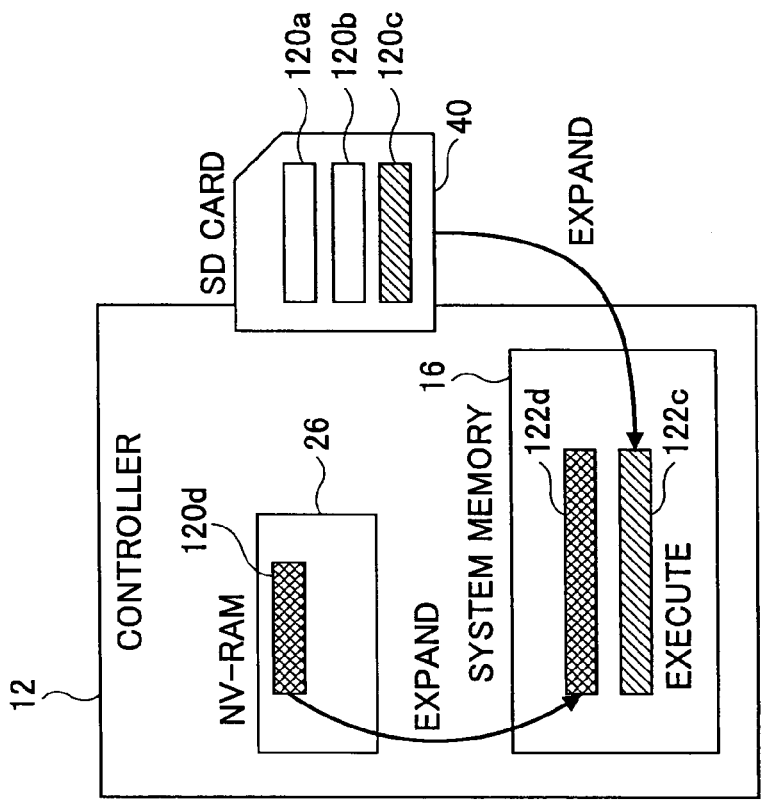
FIG. 5B is a diagram showing a program executed by an electronic device according to an embodiment.
Figure 5A:
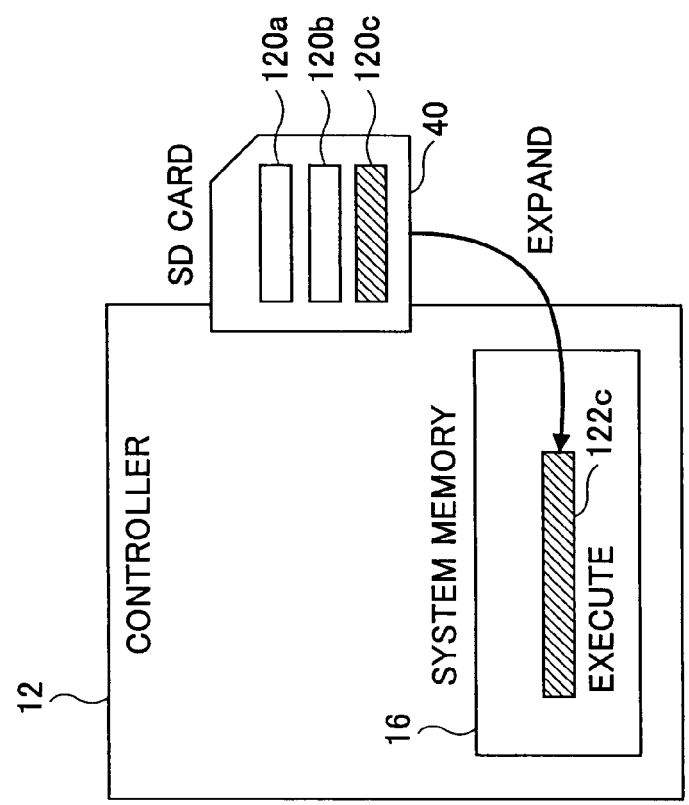
FIG. 5A is a diagram showing a program executed by an electronic device according to an embodiment.

FIGS. 5A and 5B are diagrams showing a program executed by the image forming apparatus 10 according to the present embodiment. FIG. 5A shows execution of programs stored in the SD card 40. The SD card 40 shown in FIG. 5A stores programs 120a to 120c and is installed on an SD card slot of the controller 12, the SD card slot being not shown in the drawings. As shown in FIG. 5A, the program 120c stored in the installed SD card 40 is expanded in the storage area of the system memory 16. The image forming apparatus 10 executes a program 122c (corresponding to the expanded program 120c) under control of the CPU 14.

FIG. 5B shows execution of programs stored in the SD card 40 and the NV-RAM 26. The SD card 40 shown in FIG. 5B stores the programs 120*a* to 120*c* and the NV-RAM 26 stores a program 120*d*, respectively. As shown in FIG. 5B, the program 120*c* stored in the SD card 40 and the program 120*d* stored in the NV-RAM 26 are expanded on the storage area of the system memory 16 and the image forming apparatus 10 executes the program 120*c* and the program 120*d* under control of the CPU 14. In addition, the program 122*c* and a program 122*d* expanded and executed on the system memory 16 may exchange messages via interprocess communication.

As mentioned above, in the image forming apparatus 10, the programs are read from the removable storage medium (SD card 40), expanded, and executed. Further, operation of the image forming apparatus 10 may be controlled by the program. Accordingly, when the storage medium storing the program is detached while the program is being executed, for example, or when the program stored in the storage medium is rewritten or deleted in an unauthorized manner, there is a risk of causing abnormal operation or abnormal end of the program being executed and abnormal operation of the image forming apparatus 10. In particular, in the power supply mode in which detection of the installation or removal of a storage medium is disabled and power supply to the slot 32 for removable storage media and the CPU 14 is stopped, it is impossible to detect the installation or removal of the storage medium during such a mode, so that data contents may be altered or stolen through unauthorized operations.

The following describes a verification process for detecting unauthorized use of a storage medium which may be occurred during a power supply state in which detection of the installation or removal of a storage medium is disabled and power supply to the CPU 14 or the slot 32 may be stopped. A status of the controller off mode as the power supply state in which detection of installation and removal is disabled is described using an example of a normal standby mode as a power supply state in which the detection of the installation and removal is enabled. The controller off mode refers to a power supply mode in which power supply to an entire portion of the controller 12 including the memory is stopped and it is impossible to detect the installation or removal of a storage medium or to access a non-volatile storage medium such as the HDD 24, the NV-RAM 26, or the like.

Figure 6:
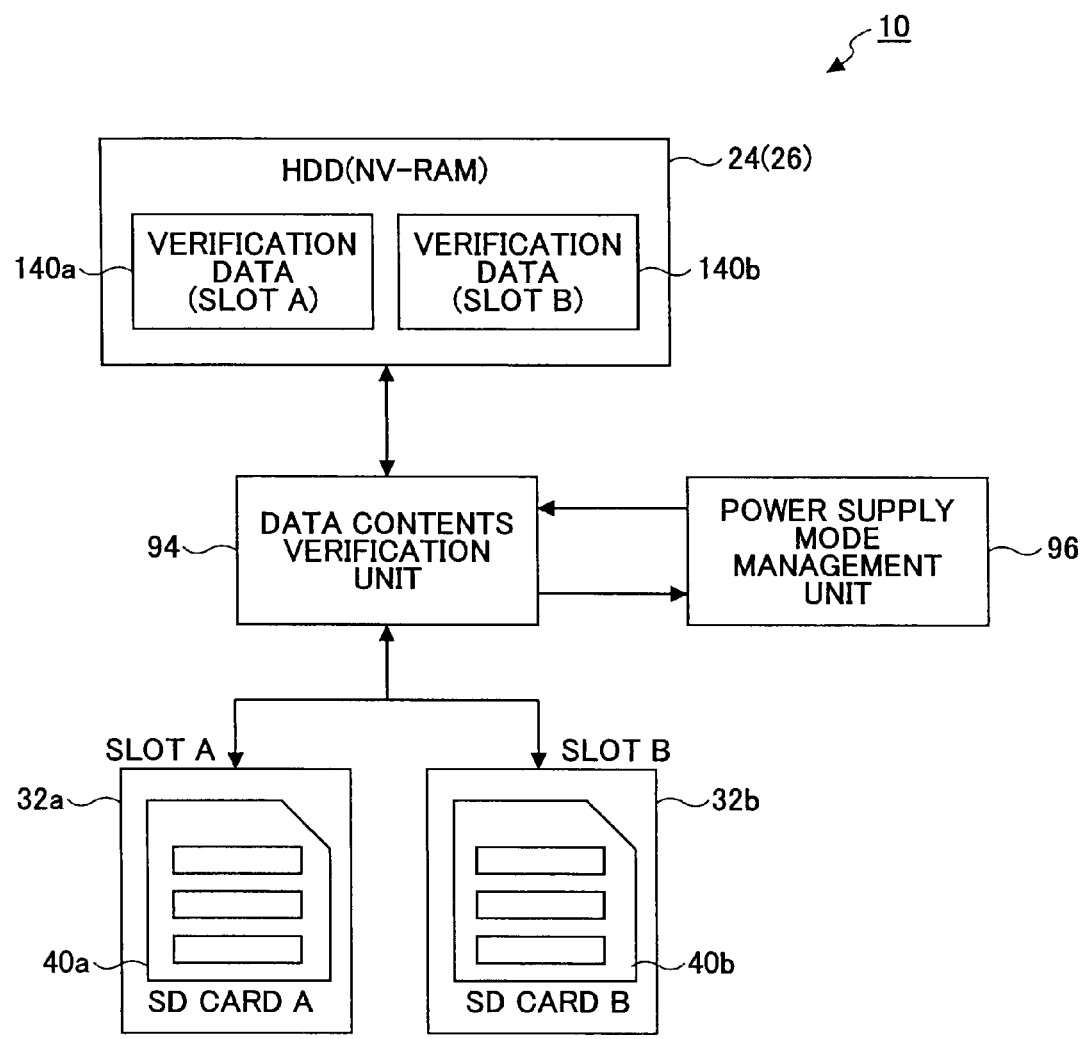
FIG. 6 is a diagram showing an embodiment of data flow when an electronic device according to an embodiment verifies validity of a removable storage medium.

FIG. 6 is a diagram showing an embodiment of data flow when the image forming apparatus 10 according to the present embodiment verifies validity of a removable storage medium. As shown in FIG. 6, the image forming apparatus 10 includes a power supply mode management unit 96 managing a power supply mode of the image forming apparatus 10 and a data contents verification unit 94 verifying data contents stored in the SD card 40 installed on the slot 32. In the embodiment shown in FIG. 6, although the image forming apparatus 10 includes two slots 32 having a slot A32*a* and a slot B32*b*, a number of slots for the slot 32 may be one or not less than three.

The data contents verification unit 94 obtains, before shifting to the controller off mode, verification data 140 (verification data for saving) for verifying data contents stored in the SD card 40 and stores the verification data 140 in the HDD 24 which is a non-volatile storage unit or in the NV-RAM 26. In the following, the HDD 24 is described as an example. As shown in FIG. 6, when the image forming apparatus 10 includes plural slots 32, the plural slots 32 may be discriminated and the verification data for saving may be stored (as verification data 140*a* or 140*b*, for example).

Further, the data contents verification unit 94 compares, after returning from the control off mode, the verification data 140 for saving stored in the HDD 24 before shifting to the controller off mode with verification data 160 newly obtained after the return and performs a verification process of data contents stored in the SD card. The power supply mode management unit 96 detects generation of an event which triggers the shifting to the control off mode and notifies a request for shifting to the controller off mode to each function unit including the data contents verification unit 94 constituting the image forming apparatus 10. Then, the power supply mode management unit 96 awaits a response and performs a power supply mode shifting process when shifting of a power supply mode is judged to be possible.

The data contents verification unit 94, upon receiving the request for shifting to the controller off mode from the power supply mode management unit 96, obtains the verification data stored in the SD card 40 and stores the obtained verification data in the HDD 24 as the verification data 140 for saving. The data contents verification unit 94 awaits the storing of the verification data to be completed and notifies the power supply mode management unit 96 of the fact that shifting to the controller off mode is possible. It is possible to construct the power supply mode management unit 96 as a software unit included in the SCS 84 in the software structure shown in FIG. 3.

FIGS. 7A and 7B show an embodiment of a data structure of the verification data used upon verifying validity of an SD card. FIG. 7A shows verification data for saving (140*a* and 140*b*) to be stored before shifting to the controller off mode. The verification data 140 for saving shown in FIG. 7A includes a field 142 for storing a serial ID assigned to the SD card 40 and a table 144 for containing file information stored in the SD card 40. The table 144 of the verification data 140 for saving includes a field 146 for containing a file name, a field 148 for containing a file size, and a field 150 for containing an update time for a file. Such verification data for saving is managed in each slot 32. For example, the verification data is stored as the verification data 140*a* for saving for the slot A32*a* and as the verification data 140*b* for saving for the slot B32*b*.

FIG. 7B shows verification data for comparison newly obtained from the SD card installed on the slot after returning from the control off mode. The verification data 160 for comparison includes, in the same manner as in the data structure shown in FIG. 7A, a field 162 for storing a serial ID and a table 164 for containing file management information. The table 164 includes a file name field 166, a file size field 168, and an update time field 170.

As shown in FIGS. 7A and 7B, when the verification data 140 for saving is compared with the verification data 160 for comparison, an item of the field 148 for a record containing "file 3" in the field 146 of the verification data 140 for saving is "300 KB" and an item of the file size field 168 for a record containing "file 3" in the file name field 166 of the verification data 160 for comparison is "400 KB", so that both file sizes are different. In general, when a file is changed, information such as the file size and the update time for a file is rewritten, so that the above-mentioned change indicates that file 3 is changed in any way. In other words, the verification data 140 for saving before shifting to the controller off mode is compared with the verification data 160 for comparison after returning from the controller off mode so as to extract the difference, so that it is possible to detect whether the SD card is changed in any way and specify which file data is changed when the SD card is changed.

In addition, verification data for verifying data contents stored in the SD card 40 may employ any data or any combination of data characteristic of the data contents stored in the SD card such as a serial ID of the SD card, a tree structure of directories in the SD card, file attributes such as a file name, file size, update time, access time, owner, and access authority (access attribute), file data per se, and data selected from a group including data set made of any combination of such data. The verification data is read and obtained from the SD card. It is also possible to employ a hash value as the verification data, the hash value being obtained by calculating the above-mentioned data using a message digest function and the like.

Figure 8:
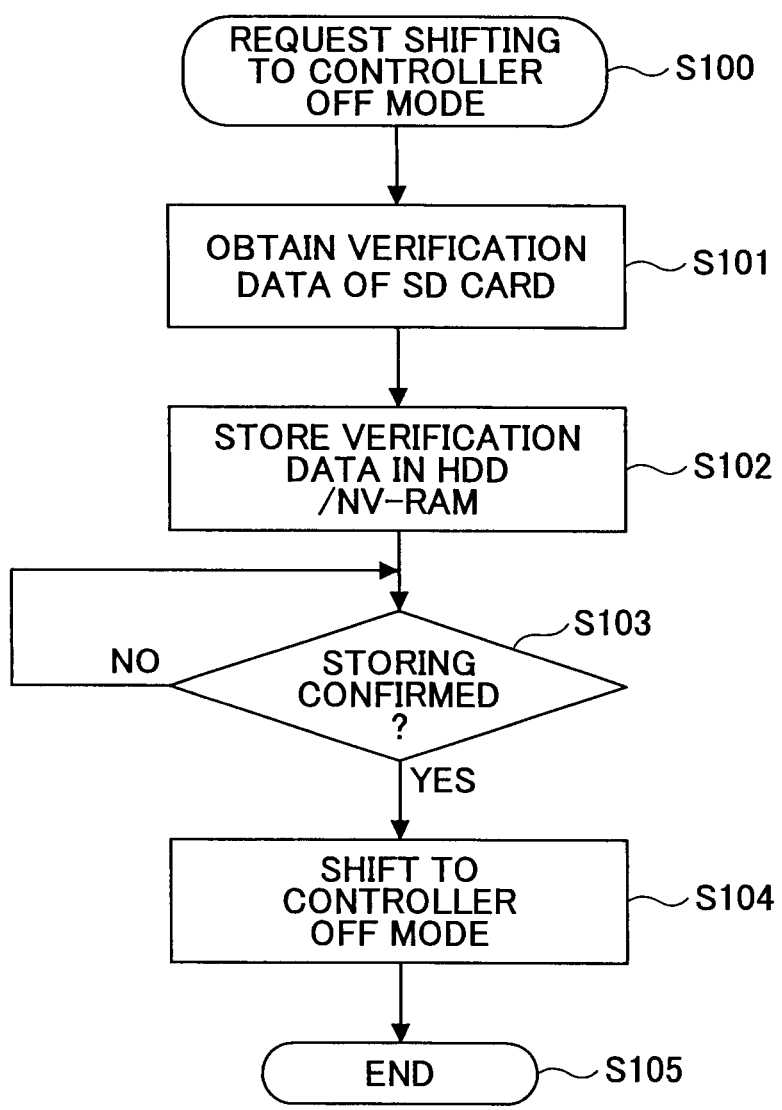
FIG. 8 is a flowchart showing an embodiment of a process flow performed by an electronic device according to an embodiment upon detecting generation of a request for shifting to a controller off mode.

FIG. 8 is a flowchart showing an embodiment of a process flow performed by the image forming apparatus 10 according to the present embodiment upon detecting generation of a request for shifting to the controller off mode. The process shown in FIG. 8 starts in step S100 when the image forming apparatus 10 detects generation of an event to trigger the request for shifting to the controller off mode (elapse of a certain period of time in an idle state, for example). The power supply mode management unit 96 which has detected the generation of the request notifies the request for shifting to the controller off mode to each function unit of the image forming apparatus 10 including the data contents verification unit 94. In step S101, the data contents verification unit 94 which has received the notification reads management information such as file attributes from the installed SD card 40 and obtains verification data. In step S102, a storing instruction is issued to a non-volatile storage unit such as the HDD 24 or the NV-RAM 26 so as to store the obtained verification data as verification data for saving. In step S103, the process awaits a response from an HDD access driver and judges whether storing of the verification data 140 for saving is successfully completed and the process enters a loop until completion is confirmed.

On the other hand, upon judgment in step S103, if the completion of storing of the verification data 140 for saving is confirmed (yes), the process branches into step S104, where the data contents verification unit 94 notifies completion of preparation of mode shifting to the power supply mode management unit 96 and the power supply mode management unit 96 which has received the notification that the preparation of mode shifting is completed from the data contents verification unit 94 and other function unit performs a process of shifting to the controller off mode and stops the process in step S105.

In the process flow shown in FIG. 8, after the generation of the request for shifting to the controller off mode is detected, the verification data is obtained in step S101, the verification data is stored in the HDD 24 as verification data for saving in step S102, the completion of the storing is confirmed in step S103, and the mode shift is performed in step S104. However, the obtaining process of the verification data is not limited to a specific time as long as the process is completed before shifting to a power supply mode in which it is impossible to detect the installation or removal of a storage medium. Further, when the power supply mode shifts to a power supply mode in which it is impossible to access a non-volatile storage medium, the process of storing the obtained verification data is not limited to a specific time as long as the process is completed before shifting to such a power supply mode.

In other embodiment, for example, in background processing, (1) when installation and removal of an SD card is monitored and the installation of the SD card is detected, or (2) when predetermined time intervals are periodically measured and (3) a change of data contents (writing, deletion, or the like in a file) stored in the SD card is detected, it is possible to obtain and store the verification data so as to update a changed portion in each detection.

Figure 9:
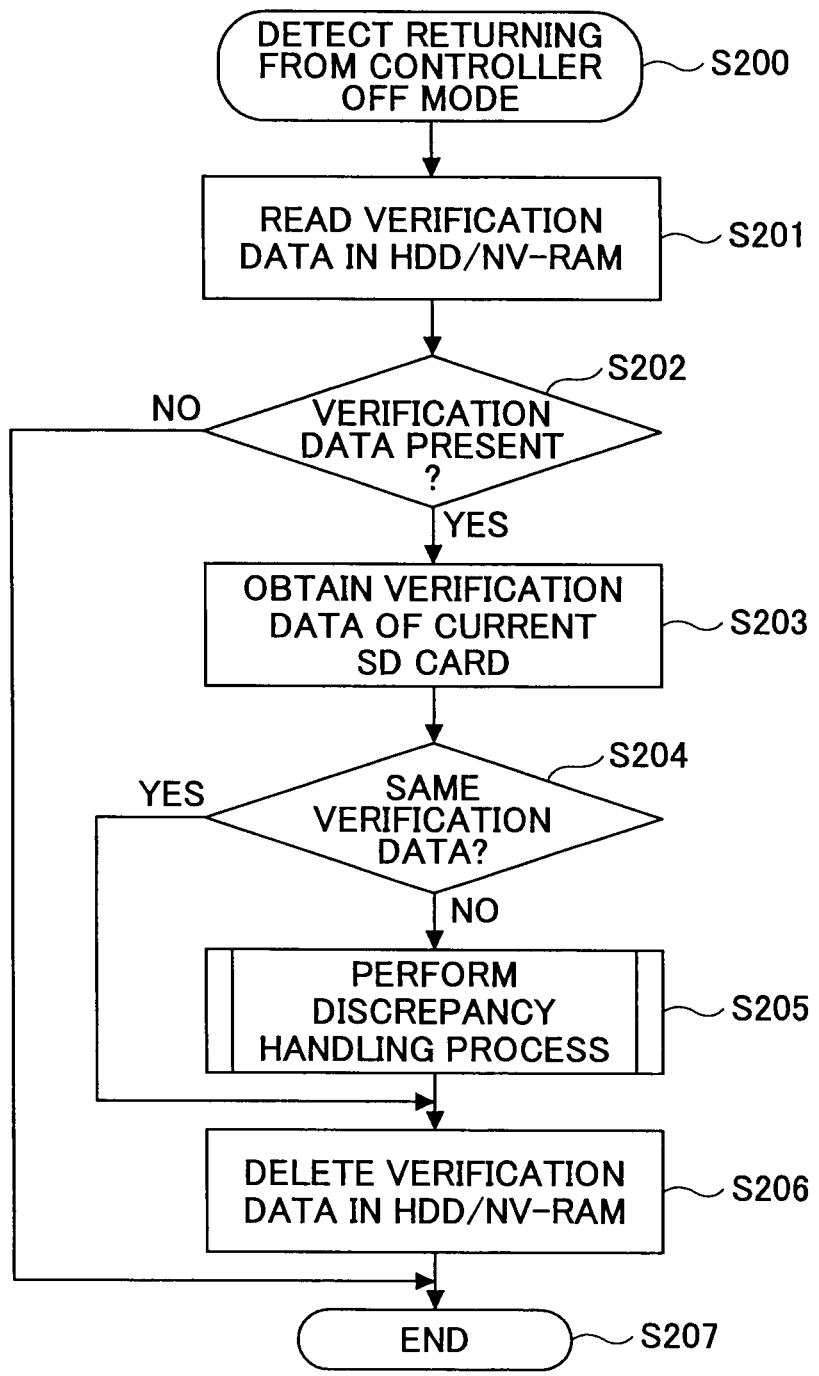
FIG. 9 is a flowchart showing an embodiment of a process flow performed by an electronic device according to an embodiment upon detecting returning from a controller off mode to a normal mode.

FIG. 9 is a flowchart showing an embodiment of a process flow performed by the image forming apparatus 10 according to present embodiment upon detecting returning from the controller off mode to a normal mode. The process shown in FIG. 9 starts in step S200 when a notification is received from the power supply mode management unit 96 which has detected the returning from the controller off mode. In step S201, the data contents verification unit 94 tries to read the verification data 140 for saving from the HDD 24 (or the NV-RAM 26) and obtains the verification data 140 for saving when the data is stored.

In step 202, the process branches depending on presence or absence of the verification data 140 for saving. If the verification data 140 for saving is judged to be not stored (no), there is no need for verification, so that the process branches into step S207 so as to enc the process. By contrast, if the verification data 140 for saving is judged to be stored (yes), the process branches into step S203. In step 203, the verification data 160 for comparison is newly obtained from an SD card being installed after returning so as to read management information such as file attributes and verify validity.

In step 204, the data contents verification unit 94 which has obtained the verification data 160 for comparison judges whether the verification data 140 for saving is the same as the verification data 160 for comparison. If both data is judged to be the same (yes), the process branches into step S206. In step S206, a request for deleting the verification data 140 for saving is issued and the process ends in step S207.

By contrast, if both data is judged to be not the same (no), the process branches into step S205, where a discrepancy handling process is performed and a result of the process is received. In step S206, a request for deleting the verification data 140 for saving is issued and the process ends in step S207.

The judgment in step S202 determines whether the SD card 40 is installed on the slot 32 by judging the presence or absence of the verification data 140 for saving before shifting to the controller off mode. In other embodiment, a flag indicating whether the SD card 40 is installed on the slot 32 may be set and a state value may be stored in a non-volatile storage unit so as to judge using the flag.

In the judgment of step S204 mentioned above, it is possible to verify identity of the verification data by comparing each value constituting the verification data or calculating the hash value of an entire portion of the verification data. In addition, when the SD card 40 is not installed on the slot 32 upon returning from the controller off mode, the stored verification data may be deleted and the SD card may be unmounted or when there is a program module mounted from the SD card, the program module may be unmounted.

Figure 10:
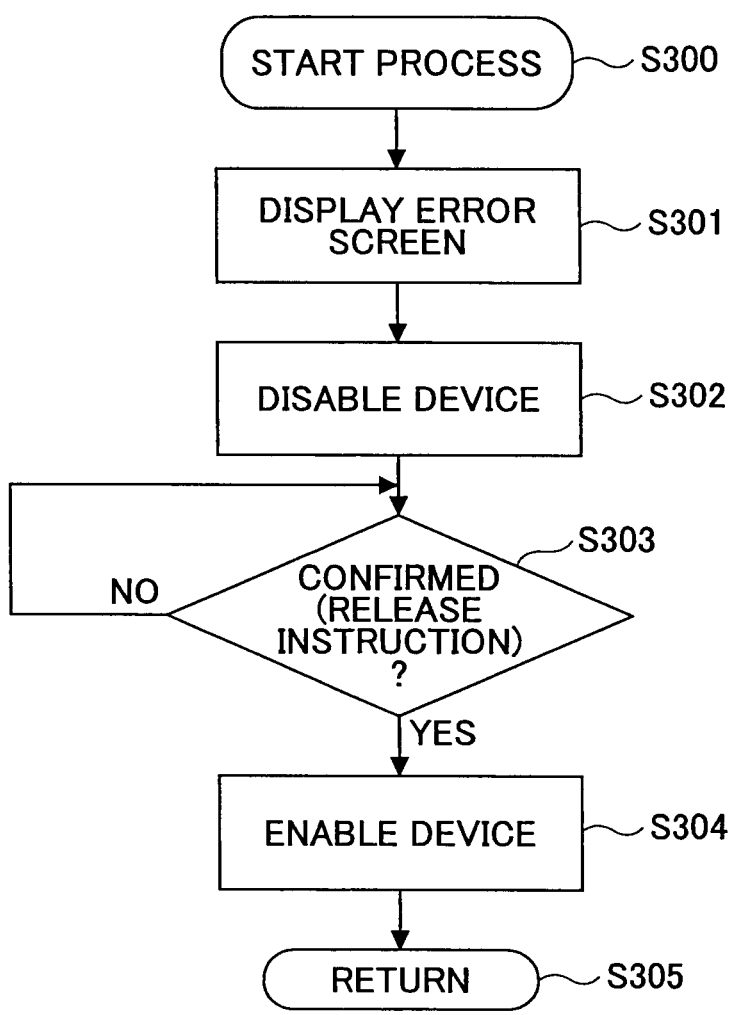
FIG. 10 is a flowchart showing an embodiment of a process performed by an electronic device when data contents stored in an SD card are judged to be not the same as a result of verification.
Figure 13A:
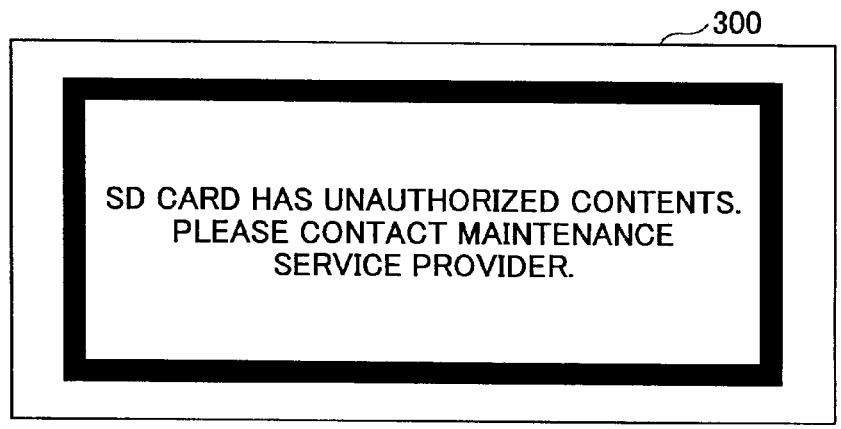
FIG. 13A is a diagram showing an embodiment of a warning display screen displayed on an operation panel of an electronic device.
Figure 13B:
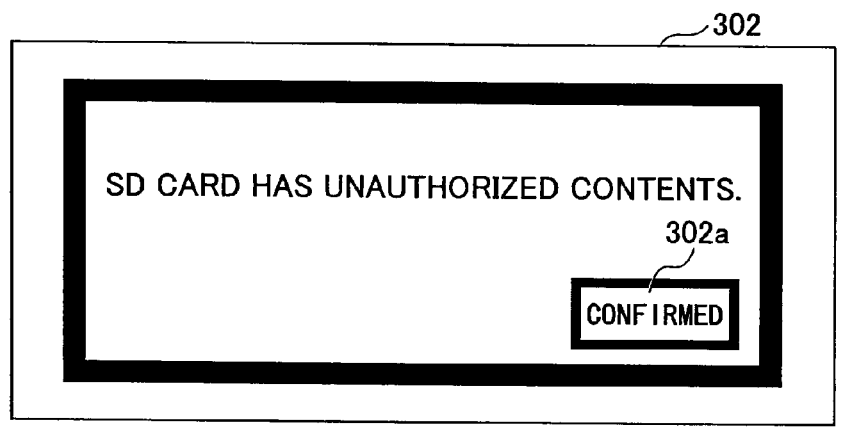
FIG. 13B is a diagram showing an embodiment of a warning display screen displayed on an operation panel of an electronic device.
Figure 13C:
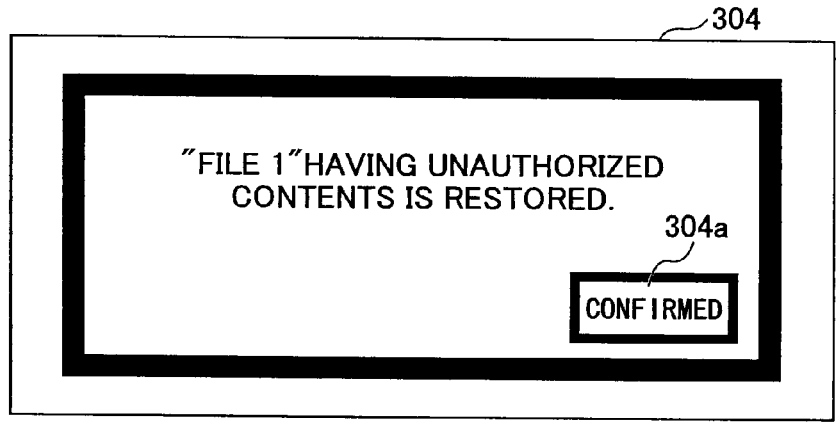
FIG. 13C is a diagram showing an embodiment of a warning display screen displayed on an operation panel of an electronic device.

FIG. 10 is a flowchart showing an embodiment of a process performed by the image forming apparatus 10 when the process of step 205 in the process flow, namely, data contents stored in the SD card are judged to be not the same as a result of verification. Further, FIGS. 13A, 13B, and 13C show embodiments of a warning display screen displayed on the operation panel 42 of the image forming apparatus 10, for example. The process shown in FIG. 10 starts in step S300. In step S301, a warning screen 300 notifying that the operator should contact a maintenance service provider is displayed on the operation panel 42 as shown in FIG. 13A. In step S302, for example, reception of a request for operation to the image forming apparatus 10 is locked (disabled).

In step S303, the process judges whether a release instruction from the maintenance service provider is received and the process enters a loop in step S303 until the release instruction is received (during no). By contrast, in step S303, when the process judges that the release instruction from the maintenance service provider is received (yes), the process branches into step S304. In step S304, the lock of the reception of the request for operation to the image forming apparatus 10 is released (enabled), processing routine is ended in step S305, and the process returns to step S206 in the process flow shown in FIG. 9.

In other embodiment of the process performed when the data contents stored in the SD card are judged to be not the same, in step S301, a warning screen 302 requesting confirmation by the operator may be displayed as shown in FIG. 13B, for example. In step S303, the process may await a confirmation instruction from the operator and receive the confirmation instruction, and the process may end in step S305. In addition, the warning screen 302 shown in FIG. 13B has a button 302a awaiting the confirmation by the operator. In this case, the processes related to the locking and releasing the locking in the image forming apparatus 10 in step S302 and step S305 may be eliminated.

In addition, error warning notifying that validity of contents stored in a storage medium cannot be confirmed may employ, other than the warning screen display on the operation panel 42, service print by the image formation unit (ECS 74 and engine unit 46), facsimile transmission by the facsimile transmission unit (FCU 44 and FCS 80), SNMP trap notification by the network communication unit (NIC 30 and NCS 82 such as an SNMP daemon), and the like.

Figure 11:
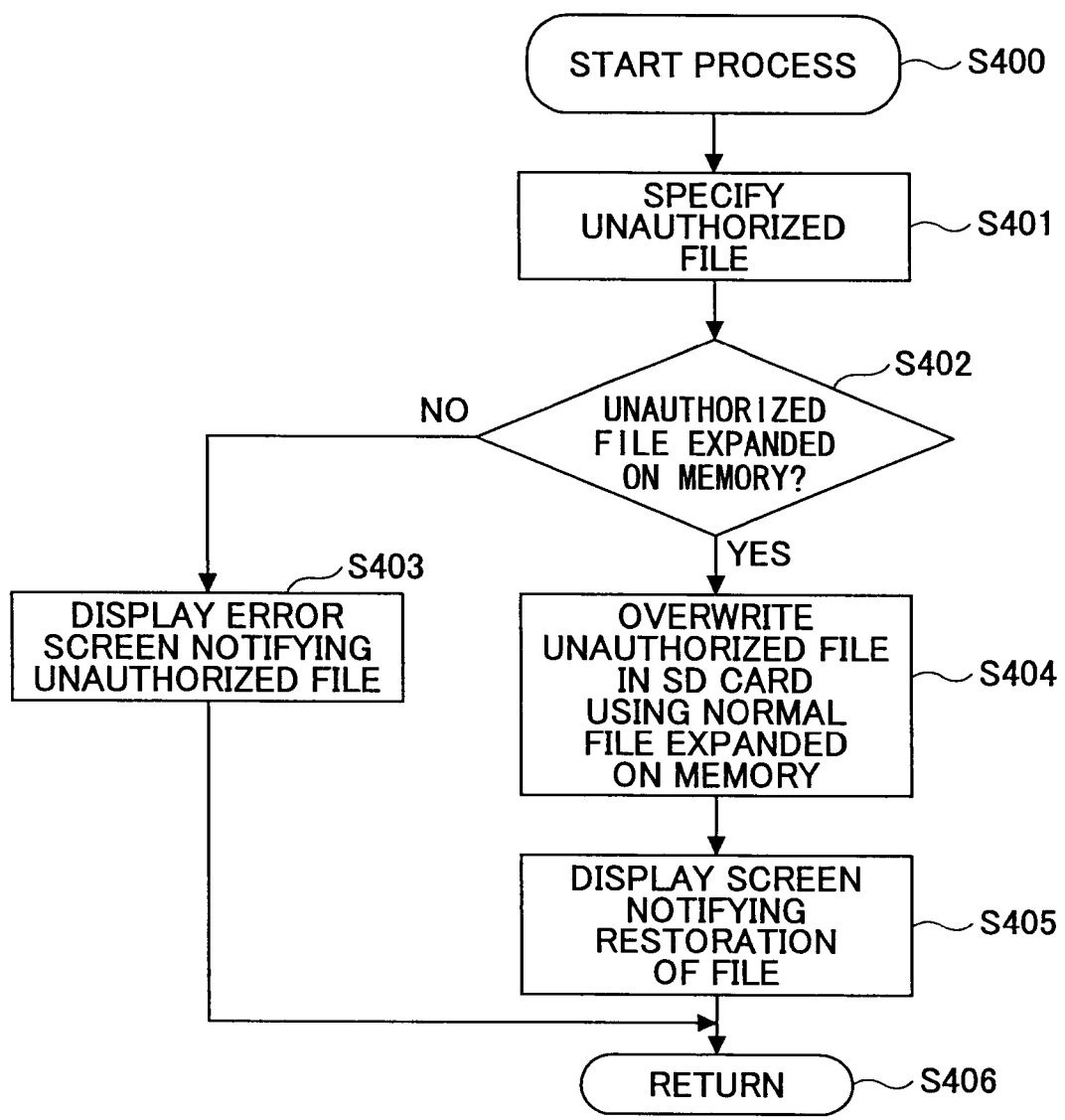
FIG. 11 is a flowchart showing another embodiment of a process performed by an electronic device when data contents stored in an SD card are judged to be not the same as a result of verification.

FIG. 11 is a flowchart showing another embodiment of the process performed by the image forming apparatus 10 when data contents stored in an SD card are judged to be not the same as a result of verification. The process shown in FIG. 11 starts in step S400. In step S401, the verification data 140 for saving before shifting to the controller off mode is compared with the newly obtained verification data 160 for comparison so as to extract difference in the data contents stored in the SD card 40, namely, so as to specify a file having such difference or a deleted file (hereafter referred to as an unauthorized file). In addition, it is possible to extract the difference by looking up the verification data 140 for saving and the verification data 160 for comparison having a structure managed on a file basis and searching for the difference.

In step S402, the process judges whether the unauthorized file is expanded on the system memory 16 by looking up a table associating a file expanded on a memory described later with a saving path of the expanded file. If the unauthorized file is judged to be expanded on the memory (yes) the process branches into step S404.

In step S404, data expanded on the memory is used for the SD card as the file expanded on the memory is normal and an overwriting process is performed on the unauthorized file, so that the unauthorized file is modified. In step S405, for example, as shown in FIG. 13C, a screen 304 notifying that the original file is restored is displayed. The process ends in step S406 and returns to step S206 in the process flow shown in FIG. 9. The screen 304 shown in FIG. 13C has a button 304a awaiting confirmation by the operator.

Further, in the judgment of step S402, if the process judges that the unauthorized file is not expanded on the memory (no), the process branches into step S403. In step S403, a name of the specified unauthorized file is displayed and a possibility that the file may have been modified is notified to the operator.

Figure 12:
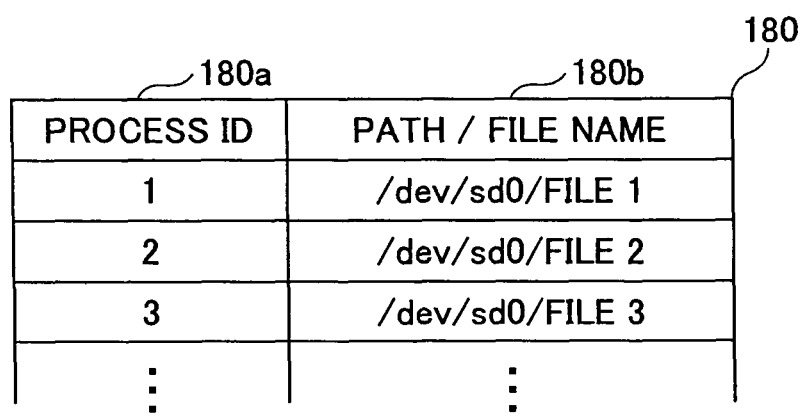
FIG. 12 is a diagram showing a data structure of a table associating a file expanded on a memory with a saving path of the expanded file.

FIG. 12 shows an embodiment of a data structure of a table 180 associating a file expanded on a memory with a saving path of the expanded file used for performing the process of step S404 in the process flow shown in FIG. 11. The table 180 shown in FIG. 12 includes a field 180a for containing a process ID of an expanded file and a field 180b for storing a saving path and a file name of the expanded file. The table 180 is activated when the program module stored in the SD card 40 is started by the program starting unit 108.

The data contents verification unit 94 specifies the unauthorized file stored in the SD card 40, looks up the table 180 so as to obtain a process ID of an active process associated with the unauthorized file, thereby specifying the process.

The restoration of the original file in the process shown in FIG. 11 is not limited to the above-mentioned method. For example, a file stored in the SD card 40 may be backed up in the HDD 24 and contents of the SD card 40 may be restored using the back up file.

In addition, the process performed after the unauthorized data contents stored in the SD card are detected is not limited in particular, so that it is possible to employ any process in accordance with a security level required for the image forming apparatus 10. For example, in another embodiment, when the specified unauthorized file is executed, the process for the unauthorized file may be ended (killed). In yet another embodiment, it is possible to delete the unauthorized file stored in a storage medium. Further, it is possible to judge whether the unauthorized file is an executable program or user data such as an address book and to change a process to be performed.

As mentioned above, according to the present embodiment, it is possible to provide an electronic device and a program capable of detecting unauthorized operations performed on a storage medium and handling when such an unauthorized operation is performed on the storage medium even when the electronic device has shifted to a power supply mode in which detection of installation and removal of the storage medium is disabled and power supply to a control unit or a slot is stopped.

By detecting the unauthorized operations, it is possible to suitably prevent abnormal operation of a program and an electronic device when the program is read and executed from a removable storage medium. Further, when user data stored in the removable storage medium is used, by detecting unauthorized operations, it is possible to handle the unauthorized operations through issuing a warning or the like. In accordance with this, it is possible to suitably prevent transmission of important business information via facsimile or file transfer to an erroneous destination without noticing altered data. Further, it is possible to perform a restoration process, deletion process, and a stop process on a file modified or deleted in an unauthorized manner.

In the above-mentioned description, the embodiments are based on shifting of power supply modes between the controller off mode and the standby mode so as to describe the verification process on the SD card before and after the mode shifting. However, any other shifting between power supply modes may be used as long as it is possible to shift between a power supply state in which power supply to the CPU or the SD card slot is stopped and the installation and removal of the SD card cannot be detected and a power supply state in which power supply is sufficiently provided and the installation and removal can be detected.

Further, in the above-mentioned description, the embodiments of an electronic device are based on an image forming apparatus (multi-function device) having plural functions. However, in the embodiments of the present invention, the electronic device may be constructed as an image forming device such as a copier, printer, and the like provided with a slot for a removable storage medium, an image reading device such as a scanner and the like, an information processing device such as a PC, server, and the like, an imaging device such as a digital camera, digital video camera, and the like, a mobile terminal such as a mobile phone, PDA, and the like, a sound and image input/output device such as a television set, HDD recorder, audio set, and the like, an in-vehicle electronic device such as a car navigation system and the like, and a home electric appliance such as a washing machine, refrigerator, microwave oven, and the like.

The removable storage medium may employ SmartMedia (SSFDC), Memory Stick (registered trademark) CompactFlash (registered trademark), xD-Picture Card (registered trademark), USB flash memory, and the like other than the SD card.

It is possible to realize the above-mentioned functions using a program executable in the device and described in a legacy programming language such as the assembly language, C, C++, c#, Java (registered trademark), or an object-oriented programming language. It is also possible to store and distribute such a device-executable program in a storage medium readable in the device such as a ROM, EEPROM, EPROM, flash memory, flexible disk, CD-ROM, CD-RW, DVD, SD memory, MO, and the like.

In the present invention, in order to achieve the above-mentioned objects, before shifting to the power supply mode in which power supply to the control unit or the slot of the electronic device is stopped and detection of installation and removal of a storage medium is disabled, a storing unit (data contents verification unit) obtains verification data for verifying validity of contents of the storage medium installed on the slot and stores the verification data in a storage unit as saving verification data (verification data for saving). The saving verification data is used to verify the validity of the storage medium when electric power is supplied to the control unit and the slot and the detection of the installation and removal of the storage medium is enabled.

When the detection of the installation and removal of the storage medium is enabled, the verification unit (data contents verification unit) compares the saving verification data with verification data (verification data for comparison) newly obtained after returning so as to judge identity and verify the validity of the contents. In accordance with this, it is possible to judge whether the storage medium holds the same contents before shifting to the power supply mode in which the detection of the installation and removal of the storage medium is disabled and after returning to a power supply mode in which the detection of the installation and removal of the storage medium is enabled and it is possible to judge whether an unauthorized operation is performed on the storage medium during the power supply mode in which the detection of the installation and removal is disabled. Further, based on a result of the judgment of the verification unit, it is possible to perform a discrepancy handling process such as notification to the user via an operation panel, an image forming unit, a facsimile transmission unit, and the like, restoration or deletion for a file judged to be not correspondent (unauthorized file), and stopping of a process, and the like.

Further, in order to store the saving verification data before shifting to the power supply mode in which the detection of the installation and removal of the storage medium is disabled, in the present invention, it is possible to wait for the storing of the saving verification data to be completed and to shift to the requested power supply mode. Moreover, in the present invention, in response to detection of the installation of the storage medium or generation of an input/output process for the storage medium, it is possible to obtain saving verification data in each detection or generation. In addition, in the present invention, it is possible to periodically obtain saving verification data following elapse of a set time and store or update the saving verification data.

The present invention is not limited to the specifically disclosed embodiment, and variations and modifications may be made without departing from the scope of the present invention.

The present application is based on Japanese priority application No. 2007-005533 filed Jan. 15, 2007, the entire contents of which are hereby incorporated herein by reference.

What is claimed is:

1. An electronic device for performing a process in accordance with contents of a removable storage medium, the electronic device comprising:
   a power supply mode management unit configured to detect generation of an event that triggers a shifting of a power supply state, and that shifts the power supply state upon receiving permission;
   a verification data obtaining unit configured to obtain verification data for verifying validity of the contents of the storage medium before issuing the permission to the power supply mode management unit to shift to a power supply state in which detection of installation and removal of the storage medium is disabled;
   a storing unit storing the verification data in a memory as saving verification data; and
   a verification unit that compares, when detection of the installation and removal of the storage medium is enabled, newly obtained verification data with the saving verification data to verify validity of the contents of the storage medium.

2. The electronic device according to claim 1, wherein the power supply mode management unit is further configured to suspend shifting to the power supply state in which detection of installation and removal of the storage medium is disabled until the verification data is stored in the memory as the saving verification data.

3. The electronic device according to claim 1, further including:
   a notification unit configured to notify that validity of the contents of the storage medium is not confirmed by the verification unit when the newly obtained verification data does not correspond to the saving verification data.

4. The electronic device according to claim 1, further including:
   a lock unit configured to reject receipt of an operation request of the electronic device as a result of validity of the contents of the storage medium not being confirmed by the verification unit when the newly obtained verification data does not correspond to the saving verification data.

5. The electronic device according to claim 1, further including:
   a process unit configured to perform, as a result of validity of the contents of the storing medium not being confirmed by the verification unit when the newly obtained verification data does not correspond to the saving verification data, a discrepancy handling process including restoration and deletion of a file judged to be not correspondent, and stop a process on a memory corresponding to the file.

6. The electronic device according to claim 1, wherein the verification data includes an identification value of the storage medium, a directory structure of the storage medium, a file stored in the storage medium, a name of the file, an update time of the file, an access time of the file, a file size of the file, an access attribute of the file, and a hash value of the file.

7. A non-transitory computer-readable storage medium storing a computer-readable program thereon which, when executed by an electronic device for performing a process in accordance with contents of a removable storage medium, directs the electronic device to perform a method, comprising:

detecting generation of an event that triggers a shifting of a power supply state, and shifting the power supply state upon receiving permission;

obtaining verification data for verifying validity of the contents of the storage medium before issuing the permission to shift to a power supply state in which detection of installation and removal of the storage medium is disabled;

storing the verification data in a memory as saving verification data; and comparing, when detection of the installation and removal of the storage medium is enabled, newly obtained verification data with the saving verification data to verify validity of the contents of the storage medium.

8. The non-transitory computer-readable medium storing a computer-readable program according to claim 7, the method further including:

suspending shifting to the power supply state in which detection of installation and removal of the storage medium is disabled until the verification data is stored in the memory as the saving verification data.

9. The non-transitory computer-readable medium storing a computer-readable program according to claim 7, the method further including:

notifying that validity of the contents of the storage medium is not confirmed when the newly obtained verification data does not correspond to the saving verification data.

10. The non-transitory computer-readable medium storing a computer-readable program according to claim 7, the method further including:

rejecting receipt of an operation request of the electronic device as a result of validity of the contents of the storage medium not being confirmed when the newly obtained verification data does not correspond to the saving verification data.

11. The non-transitory computer-readable medium storing a computer-readable program according to claim 7, the method further including:

performing, as a result of validity of the contents of the storage medium not being confirmed when the newly obtained verification data does not correspond to the saving verification data, a discrepancy handling process including restoration and deletion of a file judged to be not correspondent; and stopping of a process on a memory corresponding to the file.

12. The non-transitory computer-readable medium storing a computer-readable program according to claim 7, wherein the verification data includes an identification value of the storage medium, a directory structure of the storage medium, a file stored in the storage medium, a name of the file, an update time of the file, an access time of the file, a file size of the file, an access attribute of the file, and a hash value of the file.

* * * * *